US005619400A

United States Patent [19]

Bowman et al.

[11] Patent Number: 5,619,400

[45] Date of Patent: Apr. 8, 1997

[54] MAGNETIC CORE STRUCTURES AND CONSTRUCTION TECHNIQUES THEREFOR

[75] Inventors: Wayne C. Bowman, Allen; Ashraf W. Lotfi, Rowlett; Matthew A. Wilkowski, Mesquite, all of Tex.

[73] Assignee: Lucent Technologies Inc., Murray Hill, N.J.

[21] Appl. No.: 503,683

[22] Filed: Jul. 18, 1995

[51] Int. Cl.[6] .......... H02M 3/335

[52] U.S. Cl. .......... 363/15

[58] Field of Search .......... 363/17, 126, 127, 363/15, 45–48, 20–21, 128, 129

[56] References Cited

U.S. PATENT DOCUMENTS

| | | | |
|---|---|---|---|
| 5,327,333 | 7/1994 | Boylan et al. | 363/21 |
| 5,353,212 | 10/1994 | Loftus, Jr. | 363/17 |

OTHER PUBLICATIONS

"A New Zero–Ripple Switching DC–To–DC Converter and Integrated Magnetics" by Slobodan Cuk; California Institute of Technology; Pasadena, California; 1980 IEEE.

"A New Model for Multiple–Winding Transformer" by Q. Chen, F.C. Lee, J.Z. Jiang, and M. M. Jovanovik; Virginia Power Electronics Center; The Bradley Department of Electrical Engineering; Blacksburg, Virginia.

"Analysis of Integrated Magnetics to Eliminate Current Ripple in Switching Converters" by Slobodan Ćuk and William M. Polivka; Power Electronics Group; California Institute of Technology; PCI Apr. 1983 Proceedings.

"Modeling and Analysis of a Multi–Output Cuk Converter" by G.E. Bloom, A. Eris, R. Ruble; Litton Systems; Guidance & Controls Division; Woodland Hills, California; 1980 IEEE.

*Primary Examiner*—Aditya Krishnan

[57] ABSTRACT

A magnetic device, a method of manufacturing the magnetic device and a DC/DC converter employing the magnetic device. The magnetic device comprises: (1) a first core-portion composed of a magnetic material and having first and second legs associated therewith, the first leg having a first end face and a predetermined first cross-sectional area, the second leg having a second end face and a predetermined second cross-sectional area different from the first cross-sectional area, (2) a winding assembly having first and second windings associated therewith and disposed about first and second winding apertures, respectively, the first and second legs passing through the first and second winding apertures, respectively, to couple the first and second windings magnetically to the first and second legs, respectively, (3) a second core-portion composed of the magnetic material and adapted to mate with the first and second legs of the first core-portion and (4) an interstitial non-magnetic material of a predetermined uniform thickness disposed on the first and second end faces and joining the first and second core-portions to form a core for the magnetic device, the non-magnetic material forming a uniform air gap in the first and second legs.

20 Claims, 3 Drawing Sheets

MAGNETIC CORE STRUCTURES AND CONSTRUCTION TECHNIQUES THEREFOR

TECHNICAL FIELD OF THE INVENTION

The present invention is directed, in general, to magnetic devices and, more particularly, to magnetic devices having core legs of varying cross-sectional area to allow air gaps in the legs to be of uniform thickness, thereby decreasing the time and cost associated with manufacturing such magnetic devices.

BACKGROUND OF THE INVENTION

A magnetic device is a device that uses magnetic material arranged in a defined structure for shaping and directing magnetic fields in a predetermined manner to achieve a desired electrical performance. The magnetic fields in turn act as the medium for storing, transferring and releasing electromagnetic energy.

Magnetic devices most typically consist of a core composed of a magnetic material having a magnetic permeability greater than that of the surrounding medium (typically air). The core is of a volume and may have legs of a desired cross-sectional area. The core (or each leg thereof) is surrounded and excited by a plurality of windings of a desired number of turns and carrying an electrical current. Because of the high permeability of the magnetic core, magnetic flux produced by the windings is confined almost entirely to the core; the flux follows the path the core defines and the flux density is essentially consistent over the uniform cross-sectional area of the core.

Many magnetic devices contain air gaps in their core legs to reduce their tendency to saturate. In such devices, the core is divided into core-halves that mate at corresponding core faces. When the length of the air gap between the core-halves is less than the cross-sectional area of the adjacent core faces, the magnetic flux is essentially constrained to reside in the core and the air gap and is continuous throughout the magnetic device. The resulting reluctance of the magnetic device is an aggregate function of the length of the air gap, the cross-sectional area of the core legs, the number of windings surrounding each of the core legs and the permeability of the magnetic material constituting the core.

To ensure that a particular core configuration is as generic as possible to the widest range of possible applications, prior art cores were provided with legs of uniform cross-sectional area and shape. The designers of such generic cores reasoned that the magnetic performance of a single, generic core could be adapted to a particular application by varying the number of windings around, and the length of the air gaps for, each core leg.

In practice, however, high volume production of magnetic devices having varying air gap lengths for each leg has proven tedious and troublesome, requiring manual labor and resulting in high manufacturing costs and unacceptable rejection rates. On a traditional high volume production line, a premolded winding assembly containing predetermined numbers of windings for each leg and provided with uniform leg apertures therethrough is registered on the uniform legs of a generic core half. A nonmagnetic material, such as paper, is manually glued onto the exposed leg faces of the core half to establish the various air gaps. Since the gap of each leg is of a different length, however, each core face is covered with a paper of different thickness. Finally, a second core half is glued in place over the first core half and air gap paper, completing the core and the magnetic device as a whole.

Unfortunately, if the wrong thickness of paper is used for even one core leg, the magnetic performance of the device is altered, often rendering it useless for the intended purpose. Further, the winding assembly with its uniform leg apertures may be inadvertently reversed with respect to the core halves. For example, in a three-leg core, the windings for leg 1 may be misplaced on leg 3 and vice versa. In devices requiring windings that vary by leg, inadvertent winding reversal with respect to the core also alters device performance.

Such deviations in magnetic device performance may substantially degrade the operation of, for instance, push-push DC/DC converters employing an isolation transformer. Such converters have, as a desired objective, low output ripple current. To achieve low ripple current, discrete inductors are used at the output to provide the necessary filtering. The problem with employing such discrete inductors is that the inductor devices are bulky and expensive.

An alternative to providing a discrete inductor involves the provision of offset tapped secondary windings in the isolation transformer. U.S. Pat. No. 5,327,333 to Boylan et al., issued Jul. 5, 1994, and entitled "Push Push DC-DC Reduced/Zero Voltage Switching Converter with Off-Set Tapped Secondary Windings," discloses such a circuit. However, to achieve zero output ripple current, a discrete inductor is still necessary for filtering the ripple at input voltages other than the input voltage for which the circuit is specifically designed. Therefore, this circuit is disadvantageous in that it employs the modified isolation transformer and a discrete inductor and thereby further increases the cost and size of the converter.

Other circuits combine the output filter inductor and the isolation transformer into one integrated magnetic device. The integrated magnetic device behaves as a combined transformer-inductor, thereby providing both voltage transformation and ripple filtering. U.S. Pat. No. 5,353,212 to Loftus, issued Oct. 4, 1994, and entitled "Zero-Voltage Switching Power Converter with Ripple Current Cancellation," discloses the advantages of such a circuit. However, while integrated magnetic devices provide a viable solution for push-push DC/DC converter circuit designs, the integrated magnetic device must be compact, cost effective and mass producible to allow its use in quantity production of push-push DC/DC converter circuits. Such devices employing varying air gaps and reversible winding assemblies are subject to the manufacturing difficulties described above.

Accordingly, what is needed in the art is a fundamental improvement in the design of cores for magnetic devices to eliminate the problems of inadvertent variations in air gap length and reversal of the winding assembly with respect to the core to allow such magnetic devices to be produced reliably on a large scale.

SUMMARY OF THE INVENTION

To address the above-discussed deficiencies of the prior art, it is a primary object of the present invention to provide a magnetic device having a core of varying leg cross-sectional area to allow air gaps in the legs to be of uniform length.

In the attainment of the above primary object, the present invention provides a magnetic device, a method of manufacturing the magnetic device and a DC/DC converter employing the magnetic device. The magnetic device comprises: (1) a first core-portion composed of a magnetic material and having first and second legs associated therewith, the first leg having a first end face and a predetermined first cross-sectional area, the second leg having a second end face and a predetermined second cross-sectional area different from the first cross-sectional area, (2) a winding assembly having first and second windings associated therewith and disposed about first and second winding apertures, respectively, the first and second legs passing through the first and second winding apertures, respectively, to couple the first and second windings magnetically to the first and second legs, respectively, (3) a second core-portion composed of the magnetic material and adapted to mate with the first and second legs of the first core-portion and (4) an interstitial non-magnetic material of a predetermined uniform thickness disposed on the first and second end faces and joining the first and second core-portions to form a core for the magnetic device, the non-magnetic material forming a uniform air gap in the first and second legs.

Thus, the present invention recognizes that, in the mass production of magnetic devices, it is far more advantageous to provide a core having legs of predetermined cross-sectional area than it is to vary the air gaps. This eliminates the high rejection rate found in prior art magnetic devices encountered when air gaps were mismatched visa vis the core legs.

In a preferred embodiment of the present invention, the first leg and the first winding aperture have a predetermined first cross-sectional shape and the second leg and the second winding aperture have a predetermined second cross-sectional shape different from the first cross-sectional shape. The winding assembly is thereby incapable of reversal with respect to the first core portion. Thus, the present invention preferably also introduces a core and winding assembly that can be assembled in only one way, further decreasing the possibility of incorrect device assembly.

In a preferred embodiment of the present invention, the second core-portion has first and second legs associated therewith and adapted to mate with the first and second legs of the first core-portion, respectively. Preferably, both the first and second core-portions are provided with portions of the core legs. However, this need not be the case, as the present invention contemplates a core having asymmetrical core-portions.

In a preferred embodiment of the present invention, the first and second windings have differing numbers of turns. As stated above, variation in the number of turns determines, in part, the magnetic performance of the device. The present invention thus preferably varies core leg cross-sectional area and winding numbers to achieve a desired performance.

In a preferred embodiment of the present invention, the magnetic device is divided into a transformer portion and an inductor portion, the magnetic device therefore being an integrated magnetic device. The present invention therefore finds particular use in integrated magnetic devices, although discrete magnetic devices are full within the broad scope of the invention.

In a preferred embodiment of the present invention, the first core portion further has a third leg associated therewith, the third leg having a predetermined third cross-sectional area different from the first cross-sectional area and the second cross-sectional area. Thus, each leg in a three-or-more leg magnetic device may have a different cross-sectional area. Such capability is particularly useful in integrated magnetic devices.

In a preferred embodiment of the present invention, the first leg and the first winding aperture have a substantially square cross-sectional shape and the second leg and the second winding aperture have a substantially round cross-sectional shape, the winding assembly thereby incapable of reversal with respect to the first core portion. The square-shaped leg is not adapted to pass through the round-shaped winding aperture, thereby forcing a desired orientation of the winding assembly with respect to the first core portion. Thus, this preferred embodiment is directed to the proverbial "square peg in a round hole."

As previously mentioned, the present invention further encompasses a DC/DC converter employing the magnetic device. The converter comprises a power train having a DC input, a DC output and power conversion circuitry coupling the DC input to the DC output. The power conversion circuitry includes an isolation transformer constructed according to the present invention as broadly defined above.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
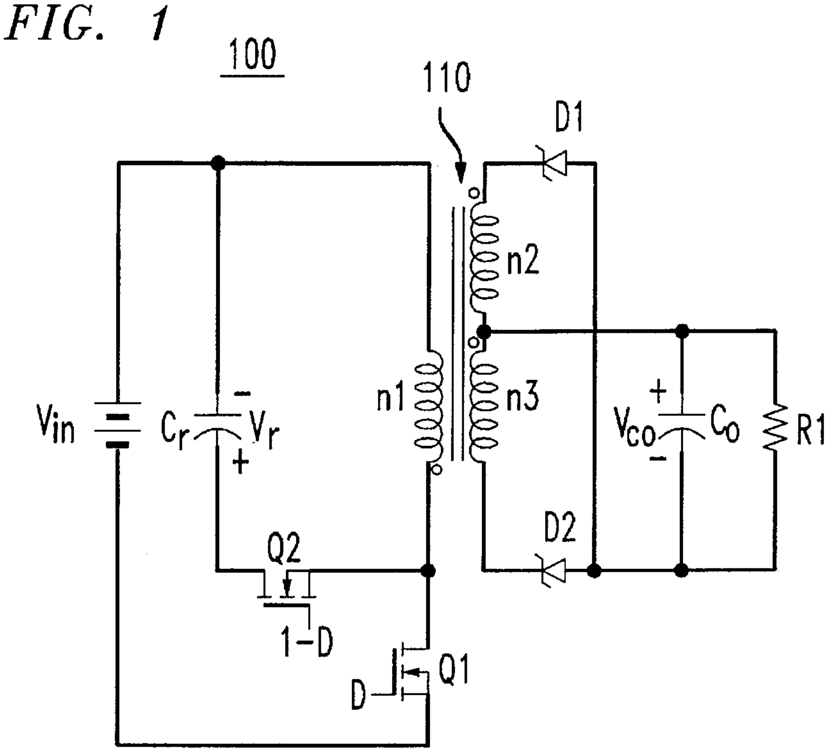
FIG. 1 illustrates a schematic diagram of a push-push DC/DC converter employing one embodiment of the magnetic device of the present invention.

Referring initially to FIG. 1, illustrated is a schematic diagram of a push-push DC/DC converter 100 employing one embodiment of a magnetic device 110 of the present invention. The magnetic device 110 in the illustrated embodiment forms an integrated magnetics device; the integrated magnetics device 110 and resulting structure are described with respect to FIG. 2.

The push-push DC/DC converter 100 operates by alternatively conducting current through a power train comprising a power switch FET Q1 and a power switch FET Q2. The power switch FET Q1 conducts for a fractional period of time described by a duty cycle D, and the power switch FET Q2 conducts for substantially most of the alternate interval (1–D). A brief dead-time may be interposed between the conduction intervals to achieve zero-voltage switching.

A capacitor $C_r$, connected in series with the power switch FET Q2, charges to a steady-state voltage $V_r$ of a DC voltage input $V_{in}$ divided by (1–D) with a polarity as displayed across the capacitor $C_r$. The capacitor $C_r$ ensures that the average voltage impressed across a primary winding n1 of the integrated magnetics device 110 is zero. The capacitor $C_r$, thereby, temporarily stores the integrated magnetics device 110 magnetizing energy during the first half of the (1–D) portion of the switching cycle and returns this energy to the integrated magnetics device 110 during the second half. Flux balance in the integrated magnetics device 110 is achieved because the average voltage applied at the primary winding n1 is zero.

The primary winding n1 of the integrated magnetics device 110 is connected to the power switch FETs Q1, Q2; a secondary winding, divided by a tap T into a second and third winding segment n2, n3, is connected to an output filter comprising a capacitor $C_o$. The output filter therein feeds a load comprising a resistor R1. A voltage $V_{co}$ is illustrated across the capacitor $C_o$. Finally, a pair of rectifying diodes D1, D2 provide rectification of the current exiting the second and third winding segments n2, n3 of the secondary winding, respectively. As previously stated, examples of push-push DC/DC converters and their associated advantages are disclosed in Boylan et al.

A desired objective of the push-push DC/DC converter 100 is to provide a designated DC output voltage with a low output ripple current. As previously discussed, low ripple current is typically achieved through discrete inductors at the output to provide the necessary filtering. In the illustrated embodiment, the output filter inductor function is performed by a leg of the integrated magnetics device 110.

Figure 2:
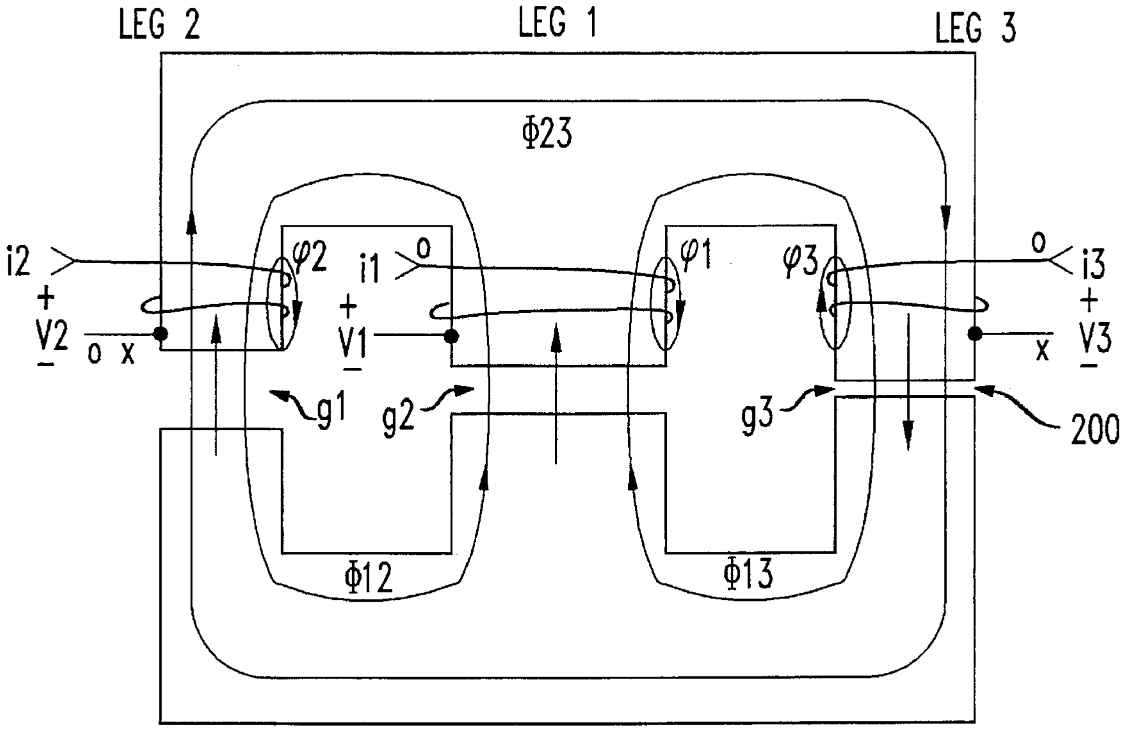
FIG. 2 illustrates an elevational view of the structure of the integrated magnetics device of FIG. 1.

Turning now to FIG. 2, illustrated is an elevational view of the structure of the integrated magnetics device 110 of FIG. 1. As previously mentioned, the integrated magnetics device 110 integrates an isolation transformer and an inductor into a single packaged device. While the illustrated embodiment employs an integrated magnetics device 110, it should be understood that discrete magnetic devices are full within the scope of the present invention. The integrated magnetics device 110 structure is wound on a E—E type core 200 with N1 turns on the primary winding n1 and N2, N3 turns on the second and third winding segments n2, n3 of the secondary winding, respectively.

In the illustrated embodiment, each portion or half of the E—E core 200 has a center leg LEG 1 and two outer legs LEG 2, LEG 3. The E—E core 200 is excited by the plurality of windings n1, n2, n3, each carrying an electrical current i1, i2, i3, respectively. As a result of the high permeability of the E—E core 200, a magnetic flux φ1, φ2, φ3 is produced by the windings n1, n2, n3 in each leg LEG 1, LEG 2, LEG 3, respectively. Also, a plurality of magnetic mutual flux lines Φ12, Φ23, Φ13 follow the paths defined by the legs LEG 1, LEG 2, LEG 3 of the E—E core 200. Finally, an air gap comprising an interstitial non-magnetic material g1, g2, g3 is defined between the respective legs LEG 1, LEG 2, LEG 3 of each half of the E—E core 200. The magnetic flux lines traverse the gaps between the legs of the E—E core 200.

Alternatively, the windings n1, n2, n3 can be fabricated in a multi-layer printed wiring board ("PWB") to achieve a compact, low cost and low profile integrated magnetics device 110. In such an implementation, the core portions or halves are clamped around the PWB or winding assembly and thereafter attached together by a suitable adhesive with gap spacers in each leg. See FIGS. 5 and 6 for a description of the multi-layer winding assembly.

Figure 3:
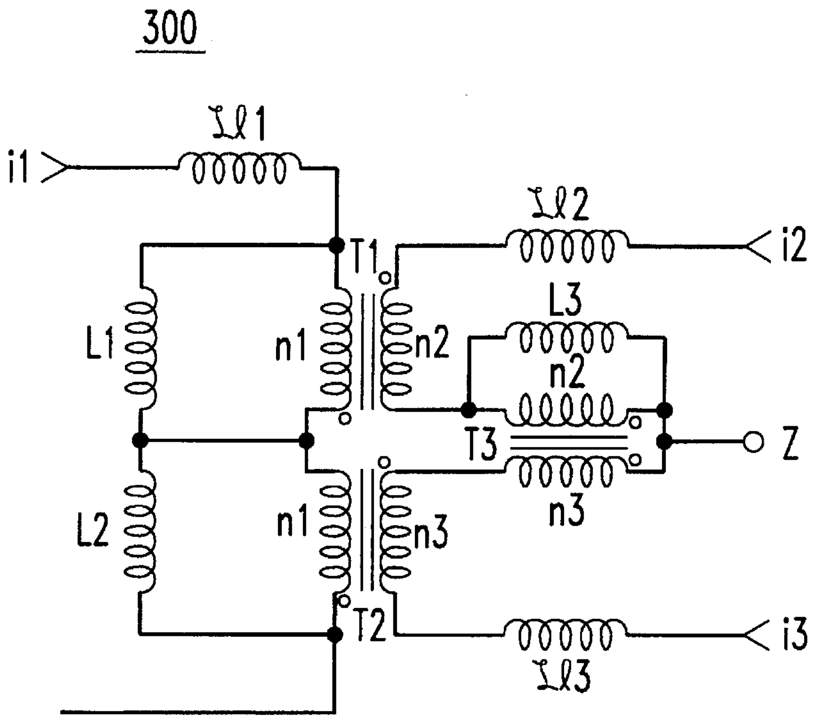
FIG. 3 illustrates a schematic diagram of a transformer-based model of the integrated magnetics device of FIG. 1.

Turning now to FIG. 3, illustrated is a schematic diagram of a transformer based model 300 of the integrated magnetics device 110 of FIG. 1. The model 300 comprises three inductors L1, L2, L3 associated with three transformers T1, T2, T3 with turns ratios of N1:N2, N1:N3 and N2:N3, respectively. The electrical currents i1, i2, i3 are illustrated traversing a leakage inductance Ll1, Ll2, Ll3 associated with each winding n1, n2, n3 of the E—E cores 200 of the integrated magnetics device 110, respectively. The third transformer T3 is in series with a connection Z leading to a positive output line of the push-push DC/DC converter 100. The magnetizing inductance associated with the third inductor L3 acts as an output filter for the push-push DC/DC converter 100. The illustrated circuit model 300 also demonstrates the coupling between the two outer legs LEG 2, LEG3 of the E—E core 200.

Figure 4:
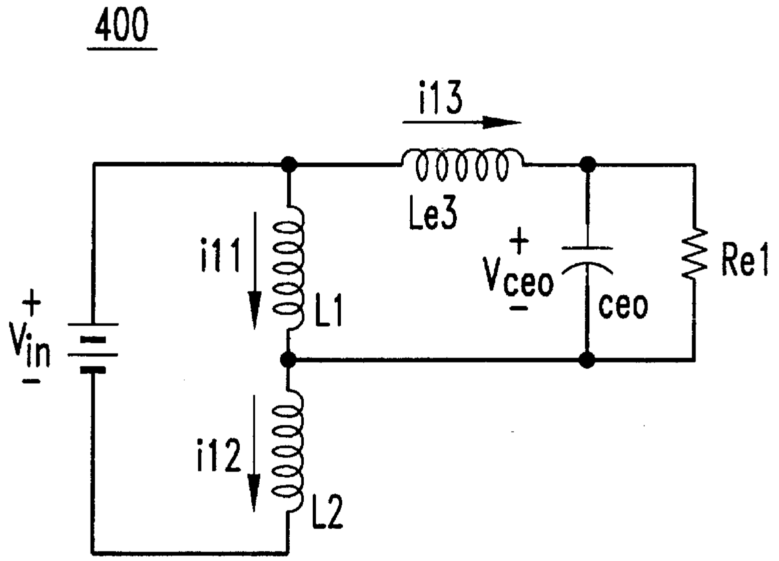
FIG. 4 illustrates a schematic diagram of an on-state circuit model of the integrated magnetics device of FIG. 1.

Turning now to FIG. 4, illustrated is a schematic diagram of an on-state circuit model 400 of the integrated magnetics device 110 of FIG. 1. The model 400 reflects the condition when the power switch FET Q1 is in the on-state and the power switch FET Q2 is in the off-state. With the voltage input $V_{in}$ applied across the integrated magnetics device 110, a ripple current i11, i12, i13 traverses the inductors L1, L2, Le3, respectively. The characteristics of the inductor Le3 are illustrated as reflected across the primary winding n1 of the integrated magnetics device 110. Similarly, the characteristics of the output filter, including the capacitor ceo with corresponding voltage $V_{ceo}$, and the load resistor Rel are also reflected across the primary winding n1 of the integrated magnetics device 110.

Now referring jointly to FIGS. 1–4, to achieve a zero ripple output condition, the ripple current i13 through the inductor L3 must equal zero. The inductors L1, L2, L3 are directly related to the reluctance of each leg LEG 1, LEG 2, LEG 3 of the E—E core 200 as indicated in the following equations:

$$L1=(N1^{2*}\Re_3)/\Re \tag{1}$$

$$L2=(N1^{2*}\Re_2)/\Re \tag{2}$$

$$L3=(N2^{2*}\Re_1)/\Re \tag{3}$$

where the reluctance $\Re$ is represented by the following equation:

$$\Re=(\Re_1*\Re_2)+(\Re_1*\Re_3)+(\Re_2*\Re_3) \tag{4}$$

The expression for the ripple current i13 can be obtained from the on-state circuit model 400. The ripple current i13 across the inductor L3 can be equated as follows:

$$\Delta iL3/\Delta t=(V_{in}*L1)/[D-V_{ceo}*(L1+L2)]/D \tag{5}$$

where D in equation (5) represents the duty cycle of the power switch FET Q1. By setting equation (5) to zero, the zero ripple condition is obtained as indicated below:

$$L1/L2=(D*N3)/[N2-(D*N3)] \tag{6}$$

Finally, equation (7) results by substituting the values of the inductances L1, L2, L3 and the corresponding reluctance $\Re$1, $\Re$2, $\Re$3 into equation (6).

$$(N2^{2*}A2*1g3)/(N3^{2*}A3*1g2)=(D*N3)/[N2-(D*N3)] \tag{7}$$

Where A2 and A3 in equation (7) represent the cross-sectional areas of the two outer legs LEG 2, LEG 3. Also, in equation (7), 1g2, 1g3 represent the length of the gaps g2, g3 in the outer legs LEG 2, LEG 3. It is apparent, then, that equation (7) may be satisfied by varying any of the following sets of parameters. First, the number of turns N2, N3 on the two outer legs LEG 2, LEG 3 may be varied. Second, the length 1g2, 1g3 of the gaps g2, g3 in the outer legs LEG 2, LEG 3 may be varied. Finally, the cross-sectional areas A2, A3 of the two outer legs LEG 2, LEG 3 may be varied.

With respect to the aforementioned relationships, it is assumed that only one parameter is altered to achieve a desired effect with a magnetic device while the other two parameters are held constant. For instance, in cases where a wire wound core with a large number of turns is used, it may be simplest to vary the number of turns since that modification only requires a minor alteration to the wire winding process.

Conversely, in applications where high-current, low-voltage modules are used, varying the number of windings is not cost effective because the secondary side of the magnetic device comprises windings with a single turn. In such a case, the length of the gaps between separate halves of the magnetic device can be varied to achieve the desired result. However, as previously mentioned it is not cost effective to manufacture and assemble multiple gap magnetic devices with gap spacers in high yields. Additionally, unequal gap arrangements for the magnetic device requires the fabrication of a custom core with three specified gaps resulting in a more expensive device. Furthermore, when the cross-sectional areas of the outer legs are identical, it is possible that during the manufacturing process that the gap locations are reversed with respect to the outer legs. Consequently, this reversal will defeat the zero ripple condition at the desired operating condition for the power conversion circuit.

Finally, varying the cross-sectional area A2, A3 of the two outer legs LEG 2, LEG 3 to achieve a desired result avoids the problems associated with the above referenced options. More specifically, employing this solution ensures that the dimensions of the two outer legs LEG 2, LEG 3 are unalike and, as a result, the orientation of the assembled cores can only be performed in one way with respect to one another. This becomes a valuable mistake-proof method of assembly that is useful when the windings are on a bobbin or lead frame or built integrally in the PWB.

A further advantage of varying the characteristics of a magnetic device through altering the cross-sectional area A2, A3 of the outer legs LEG 2, LEG 3 is that the gap spacing for each leg is identical. Uniform gap spacing provides an additional level for creating a highly reliable assembly process. Again, the ratio of the two cross-sectional areas A2, A3 is determined by equation (7) for a desired operating point to achieve a zero ripple condition. The value of each cross-sectional area A2, A3 may therein be adjusted based upon the amount of inductance required to minimize losses on the primary side of the integrated magnetics device 110 and the desired operating point.

While the aforementioned equations have been applied to the two outer legs LEG 2, LEG 3 to describe the characteristics of the integrated magnetics device 110, it should be understood that the equations are equally applicable to a combination of other legs of the integrated magnetics device 110.

Figure 5:
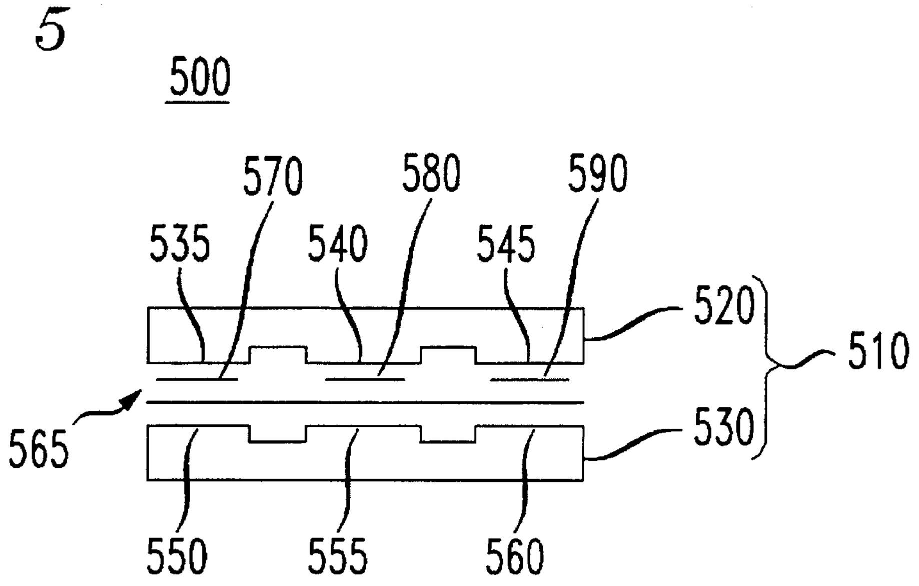
FIG. 5 illustrates an elevational view of another embodiment of a magnetic device of the present invention.

Turning now to FIG. 5, illustrated is an elevational view of another embodiment of a magnetic device 500 of the present invention. The magnetic device 500 comprises an E—E core 510 having a first core portion or half 520 and a second core portion or half 530. The first core half 520 has a first set of legs 535, 540, 545. The second core half 530 has a second set of legs 550, 555, 560 matching the first set of legs 535, 540, 545, respectively. The magnetic device 500 further comprises a winding assembly 565. Again, the winding assembly includes a plurality of windings fabricated in a multi-layer PWB. Finally, a uniform gap (not shown) exists between the first and second set of matching leg resulting from a uniform set of spacers 570, 580, 590 positioned in each gap. The spacers 570, 580, 590 maintain the uniformity in the length of the gaps.

A method for making the magnetic device 500 encompassing the present invention will be described in greater detail. First, the winding assembly 565 is provided. Next, the plurality of spacers 585, 590, 595, are located adjacent the winding assembly 565. Finally, the E—E core 510 is assembled. An epoxy adhesive is applied to the first core half 520 and the first and second core halves 520, 530 are rung together around the winding assembly 565 and the spacers 585, 590, 595. The first and second core halves 520, 530 are twisted to ring the adhesive and create a very minute interfacial bond line between the first and second core halves 520, 530.

As previously mentioned, variations in performance of the magnetic device 500 may be obtained by altering several parameters. However, the most cost effective manner to mass produce a magnetic device 500 to achieve a desired effect is by varying the cross-sectional areas of the respective legs 535, 540, 545, 550, 555, 560 of the E—E core 510.

Figure 6:
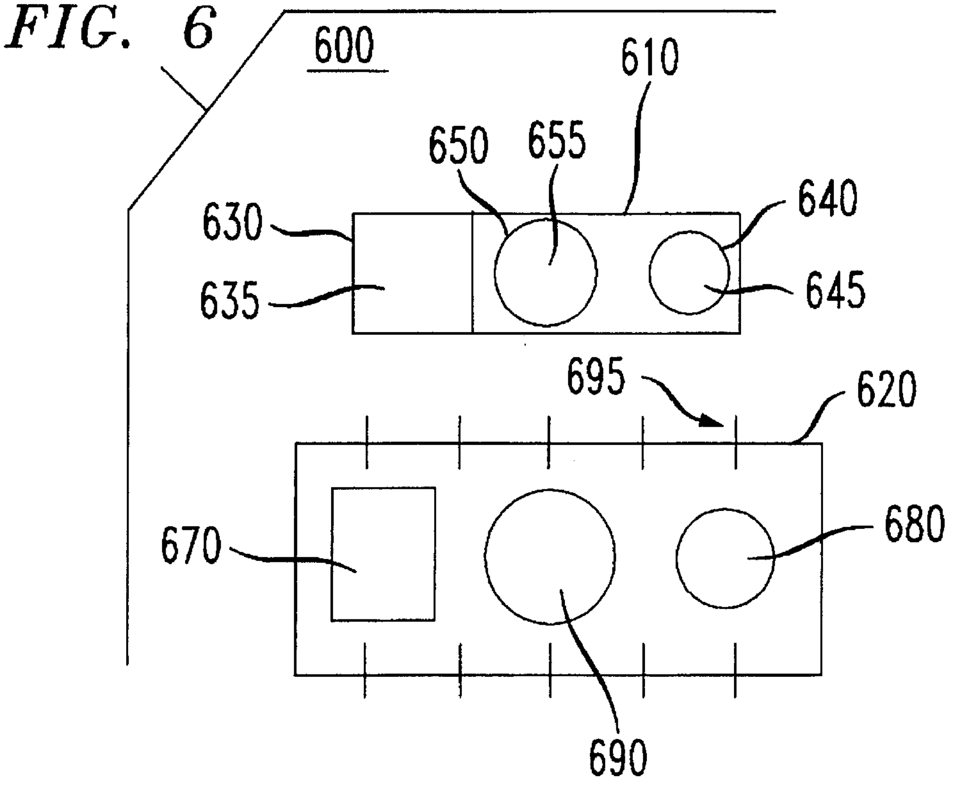
FIG. 6 illustrates a plan view of yet another embodiment of a magnetic device of the present invention.

Turning now to FIG. 6, illustrated is a plan view of yet another embodiment of a magnetic device 600 of the present invention. The magnetic device 600 comprises a first core half 610, a second core half (not shown), a winding assembly 620 and a plurality of spacers (not shown). The first core half 610 has a pair of outer legs 630, 640 and an inner leg 650. The legs 630, 640, 650 each have an end face 635, 645, 655, respectively thereon. The second core half also has a pair of outer legs and an inner leg to match the legs 630, 640, 650 of the first core half 610. The winding assembly 620 has a pair of outer winding apertures 670, 680 and an inner winding aperture 690 to accept the legs of the first and second core halves. The winding assembly 620 also includes a plurality of leads 695 for ultimate connection to a printed circuit board.

In the illustrated embodiment, the end face ("a first end face") 635 of the outer leg ("a first leg") 630 and the outer winding aperture ("a first winding aperture") 670 have a predetermined first cross-sectional shape; the end face ("a second end face") 645 of the outer leg ("a second leg") 640 and the outer winding aperture ("a second winding aperture") 680 have a predetermined second cross-sectional shape different from the first cross-sectional shape; the inner leg ("a third leg") 650 and the inner winding aperture ("a third winding aperture") 690 have a predetermined third cross-sectional shape different from the first and the cross-sectional shape. The assembly of the winding assembly 620 is thereby incapable of reversal with respect to the first core half 610 further decreasing the possibility of incorrect device assembly.

More specifically, the end face 635 of the outer leg 630 and the outer winding aperture 670 have a substantially square cross-sectional shape; the end face 645 of the outer leg 640 and the outer winding aperture 680 have a substantially round cross-sectional shape; the end face 655 of the inner leg 650 and the inner winding aperture 690 have a substantially round cross-sectional shape. The square-shaped leg 630 is not adapted to pass through the round-shaped winding apertures 680, 690, thereby forcing a desired orientation of the winding assembly 620 with respect to the first core half 610.

Although the present invention has been described in detail, those skilled in the art should understand that they can make various changes, substitutions and alterations herein without departing from the spirit and scope of the invention in its broadest form.

What is claimed is:

1. A magnetic device, comprising:

a first core-portion composed of a magnetic material and having first and second legs associated therewith, said first leg having a first end face and a predetermined first cross-sectional area, said second leg having a second end face and a predetermined second cross-sectional area different from said first cross-sectional area;

a winding assembly having first and second windings associated therewith and disposed about first and second winding apertures, respectively, said first and second legs passing through said first and second winding apertures, respectively, to couple said first and second windings magnetically to said first and second legs, respectively;

a second core-portion composed of said magnetic material and adapted to mate with said first and second legs of said first core-portion; and an interstitial non-magnetic material of a predetermined uniform thickness disposed on said first and second end faces and joining said first and second core-portions to form a core for said magnetic device, said non-magnetic material forming a uniform air gap in said first and second legs.

2. The magnetic device as recited in claim 1 wherein said first leg and said first winding aperture have a predetermined first cross-sectional shape and said second leg and said second winding aperture have a predetermined second cross-sectional shape different from said first cross-sectional shape, said winding assembly thereby incapable of reversal with respect to said first core portion.

3. The magnetic device as recited in claim 1 wherein said second core-portion has first and second legs associated therewith and adapted to mate with said first and second legs of said first core-portion, respectively.

4. The magnetic device as recited in claim 1 wherein said first and second windings have differing numbers of turns.

5. The magnetic device as recited in claim 1 wherein said magnetic device is divided into a transformer portion and an inductor portion, said magnetic device therefore being an integrated magnetic device.

6. The magnetic device as recited in claim 1 wherein said first core portion further has a third leg associated therewith, said third leg having a predetermined third cross-sectional area different from said first cross-sectional area and said second cross-sectional area.

7. The magnetic device as recited in claim 1 wherein said first leg and said first winding aperture have a substantially square cross-sectional shape and said second leg and said second winding aperture have a substantially round cross-sectional shape, said winding assembly thereby incapable of reversal with respect to said first core portion.

8. A method of manufacturing a magnetic device, comprising the steps of:

providing a first core-portion composed of a magnetic material and having first and second legs associated therewith, said first leg having a first end face and a predetermined first cross-sectional area, said second leg having a second end face and a predetermined second cross-sectional area different from said first cross-sectional area;

fitting a winding assembly onto said first core-portion, said winding assembly having first and second windings associated therewith and disposed about first and second winding apertures, respectively, said first and second legs passing through said first and second winding apertures, respectively, to couple said first and second windings magnetically to said first and second legs, respectively;

disposing an interstitial non-magnetic material of a predetermined uniform thickness on said first and second end faces; and;

joining a second core-portion composed of said magnetic material to said non-magnetic material, said second core-portion adapted to mate with said first and second legs of said first core-portion, said non-magnetic material forming a uniform air gap in said first and second legs.

9. The method of manufacturing as recited in claim 8 wherein said first leg and said first winding aperture have a predetermined first cross-sectional shape and said second leg and said second winding aperture have a predetermined second cross-sectional shape different from said first cross-sectional shape, said step of fitting comprising the step of being able to register said winding assembly in only a single prescribed orientation with respect to said first core portion.

10. The method of manufacturing as recited in claim 8 wherein said second core-portion has first and second legs associated therewith, said step of joining comprising the step of mating said first and second legs of said second core-portion with said first and second legs of said first core-portion, respectively.

11. The method of manufacturing as recited in claim 8 wherein said first and second windings have differing numbers of turns.

12. The method of manufacturing as recited in claim 8 wherein said magnetic device is divided into a transformer portion and an inductor portion, said magnetic device therefore being an integrated magnetic device.

13. The method of manufacturing as recited in claim 8 wherein said first core portion further has a third leg associated therewith, said third leg having a predetermined third cross-sectional area different from said first cross-sectional area and said second cross-sectional area.

14. The method of manufacturing as recited in claim 8 wherein said first leg and said first winding aperture have a substantially square cross-sectional shape and said second leg and said second winding aperture have a substantially round cross-sectional shape, said step of fitting comprising the step of being able to register said winding assembly in only a single prescribed orientation with respect to said first core portion.

15. A DC/DC converter, comprising:

a power train having a DC input, a DC output and power conversion circuitry coupling said DC input to said DC output, said power conversion circuitry including an isolation transformer, comprising:

a first core-portion composed of a magnetic material and having first and second legs associated therewith, said first leg having a first end face and a predetermined first cross-sectional area, said second leg having a second end face and a predetermined second cross-sectional area different from said first cross-sectional area, a winding assembly having first and second windings associated therewith and disposed about first and second winding apertures, respectively, said first and second legs passing through said first and second winding apertures, respectively, to couple said first and second windings magnetically to said first and second legs, respectively, a second core-portion composed of said magnetic material and adapted to mate with said first and second legs of said first core-portion, and an interstitial non-magnetic material of a predetermined uniform thickness disposed on said first and second end faces and joining said first and second core-portions to form a core for said magnetic device, said non-magnetic material forming a uniform air gap in said first and second legs.

16. The DC/DC converter as recited in claim 15 wherein said first leg and said first winding aperture have a predetermined first cross-sectional shape and said second leg and said second winding aperture have a predetermined second cross-sectional shape different from said first cross-sectional shape, said winding assembly thereby incapable of reversal with respect to said first core portion.

17. The DC/DC converter as recited in claim 15 wherein said second core-portion has first and second legs associated therewith and adapted to mate with said first and second legs of said first core-portion, respectively.

18. The DC/DC converter as recited in claim 15 wherein said first and second windings have differing numbers of turns.

19. The DC/DC converter as recited in claim 15 wherein said magnetic device is divided into an isolation transformer portion and an inductor portion, said inductor portion coupling said power conversion circuitry to sid DC output, said magnetic device therefore being an integrated magnetic device.

20. The DC/DC converter as recited in claim 15 wherein said first core portion further has a third leg associated therewith, said third leg having a predetermined third cross-sectional area different from said first cross-sectional area and said second cross-sectional area.

* * * * *